(No Model.) 4 Sheets—Sheet 1.

W. C. SEATON.
SIGNALING APPARATUS.

No. 255,683. Patented Mar. 28, 1882.

WITNESSES:
C. Neveux
C. Sedgwick

INVENTOR:
W. C. Seaton
BY Munn &Co.
ATTORNEYS.

(No Model.) 4 Sheets—Sheet 2.
W. C. SEATON.
SIGNALING APPARATUS.
No. 255,683. Patented Mar. 28, 1882.
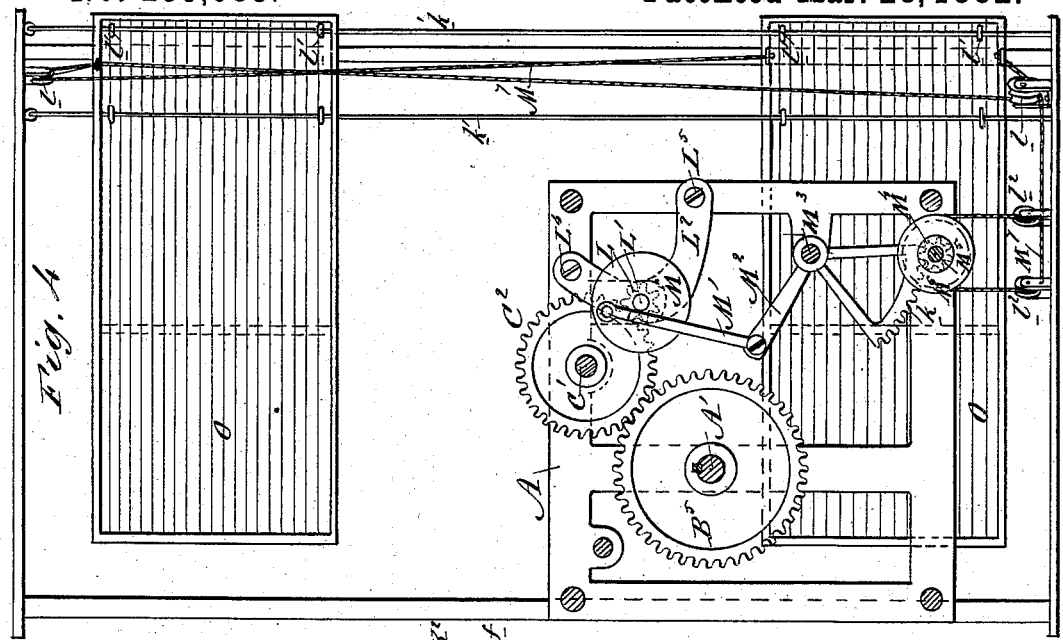
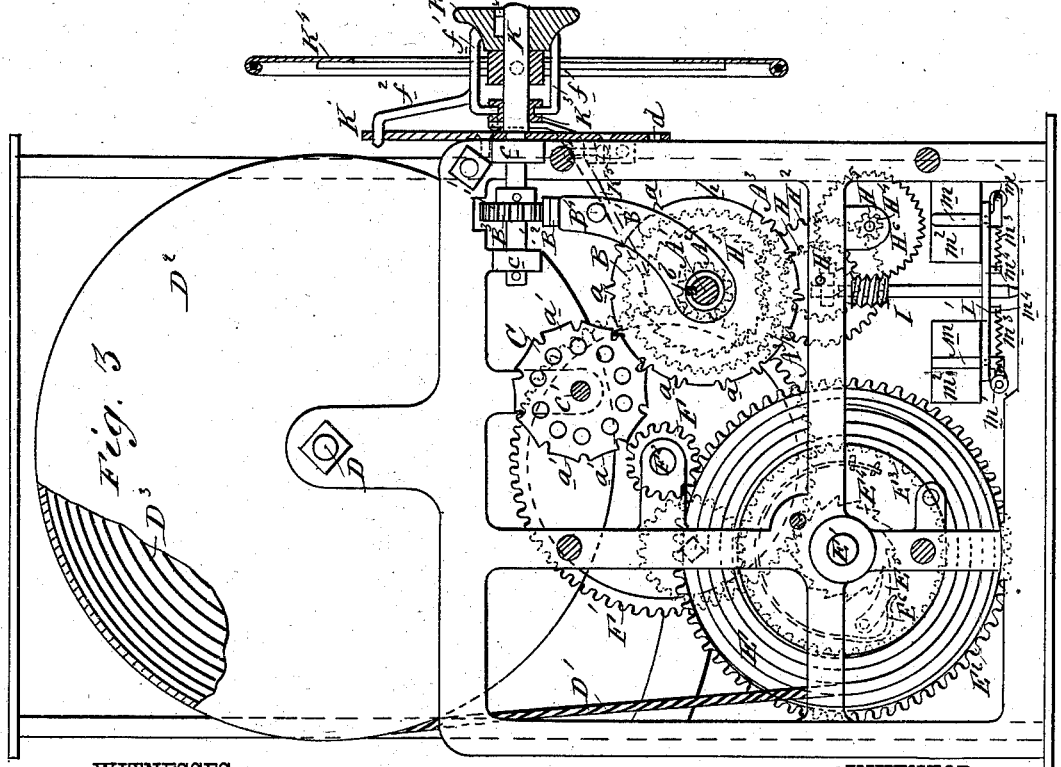
WITNESSES:
C. Neveux
C. Sedgwick
INVENTOR:
W. C. Seaton
BY Munn &Co
ATTORNEYS.

(No Model.) 4 Sheets—Sheet 3.
W. C. SEATON.
SIGNALING APPARATUS.
No. 255,683. Patented Mar. 28, 1882.
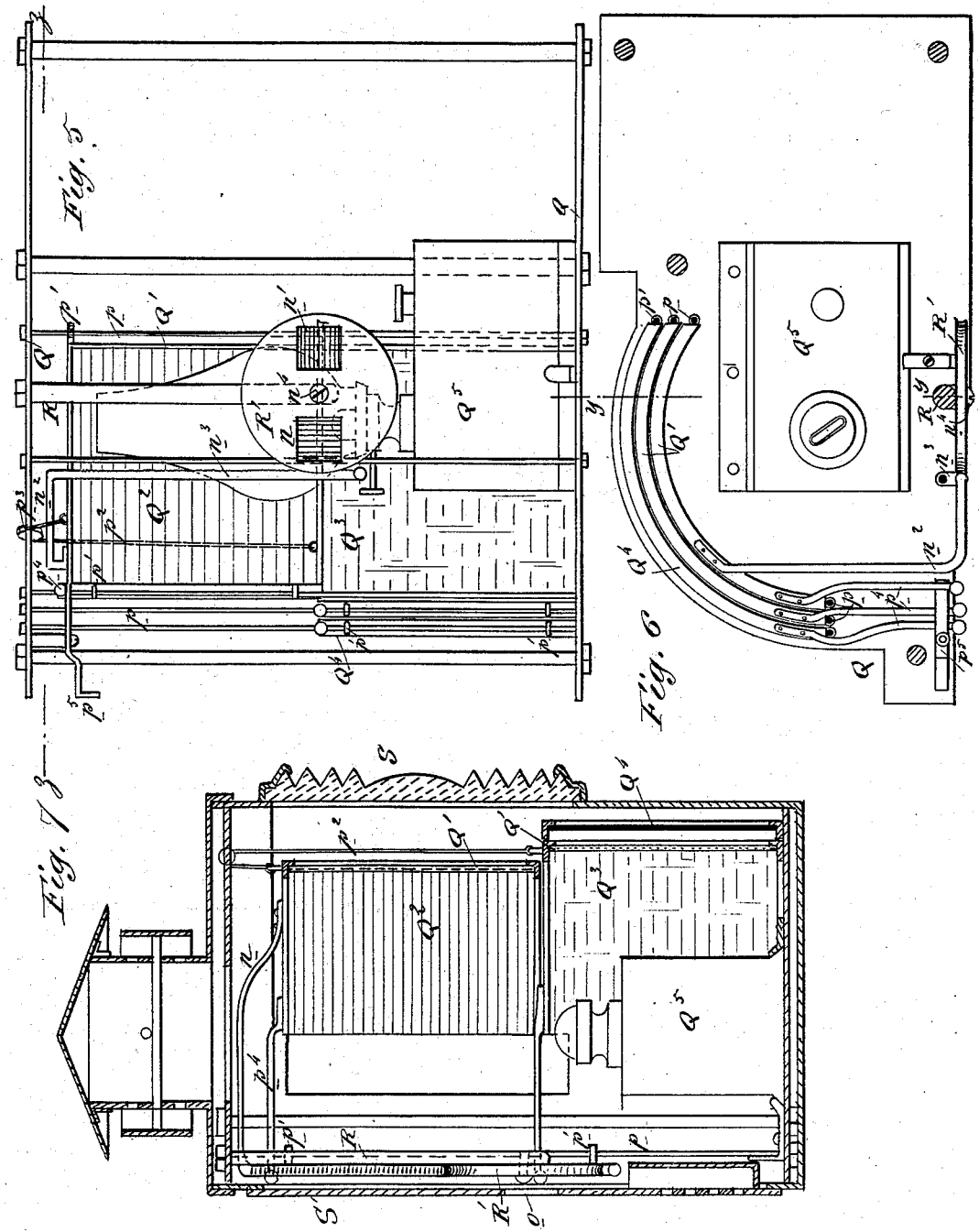

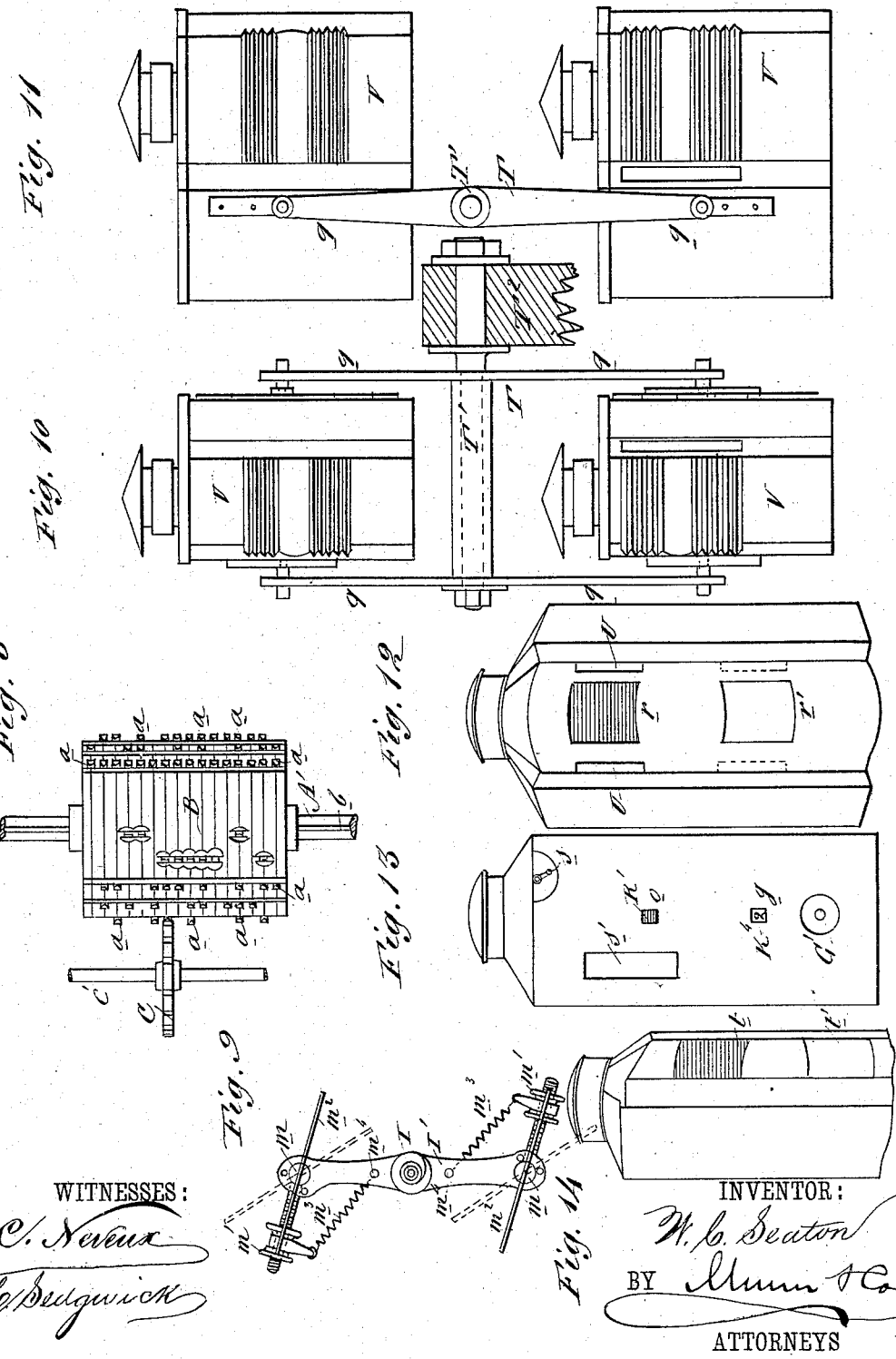

UNITED STATES PATENT OFFICE.

WILLIAM C. SEATON, OF QUEBEC, QUEBEC, CANADA.

SIGNALING APPARATUS.

SPECIFICATION forming part of Letters Patent No. 255,683, dated March 23, 1882.

Application filed July 30, 1881. (No model.)

*To all whom it may concern:*

Be it known that I, WILLIAM C. SEATON, of Quebec, in the Province of Quebec and Dominion of Canada, have invented a new and Improved Signaling Apparatus and Code for the Use of Vessels, &c., of which the following is a specification.

The object of this invention is to prevent the occurrence of collisions at sea and to otherwise decrease the dangers incident to navigation by the use and application of a signal code and apparatus, by means of which a vessel may indicate her course, point of sailing, condition—whether in stays or hove to—course designed to be pursued, &c., and may direct an approaching vessel what course to pursue, may clearly indicate starboard and port sides of the vessel, and may communicate other necessary information, and by means of which light-houses may be unmistakably identified, whereby a frequent cause of disaster to vessels is removed.

The invention consists of a lantern provided with suitable lenses and with novel mechanical devices for producing flash-signals of any desired combinations, duration, and frequency, mechanism for indicating inboard the number or character of the signals, mechanism for regulating the time or speed of the signals, and other novel mechanical combinations; and it consists, further, and in combination therewith, of lanterns for exhibiting fixed colored lights, and provided with novel devices for displaying and eclipsing the said lights and for indicating their character inboard; of a device for distinguishing the port from the starboard side of a vessel; of devices for signaling with the flash and fixed lights in two separate lanterns or in one lantern; and, further, of a signal code based upon and interpretable only by means of the combinations of these signals, intended for the use of sailing-vessels, steamers, and light-houses, all of which will be hereinafter set forth.

Figure 1:
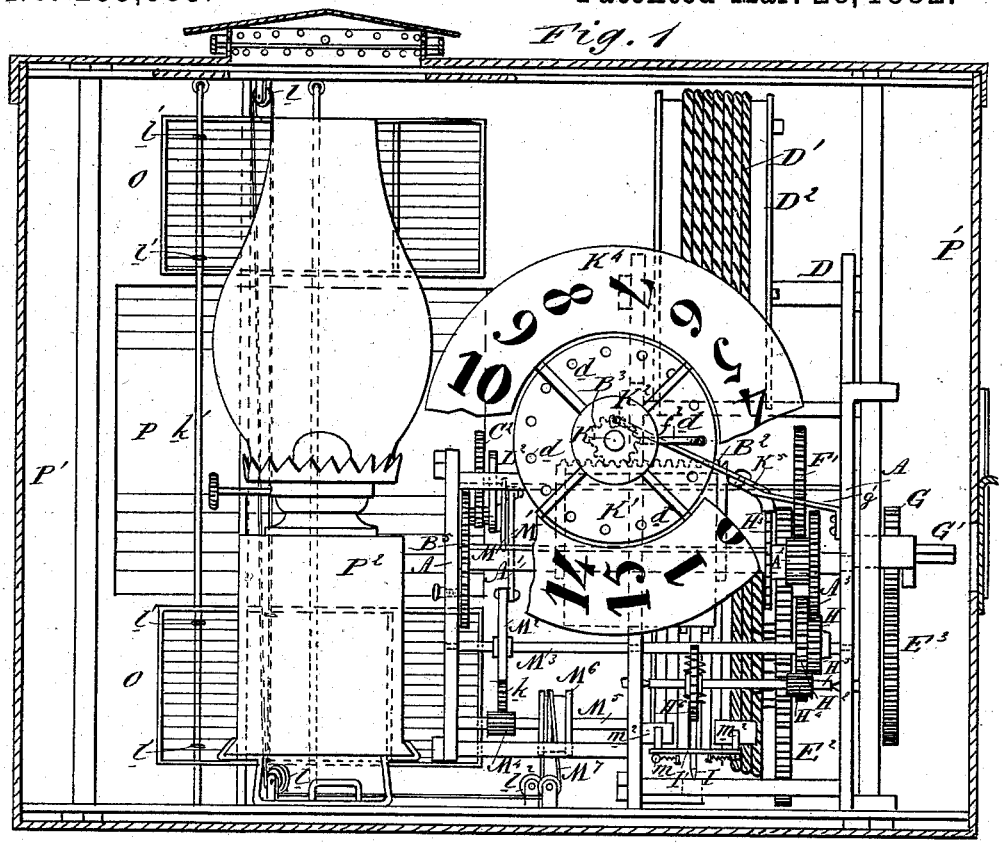
Figure 2:
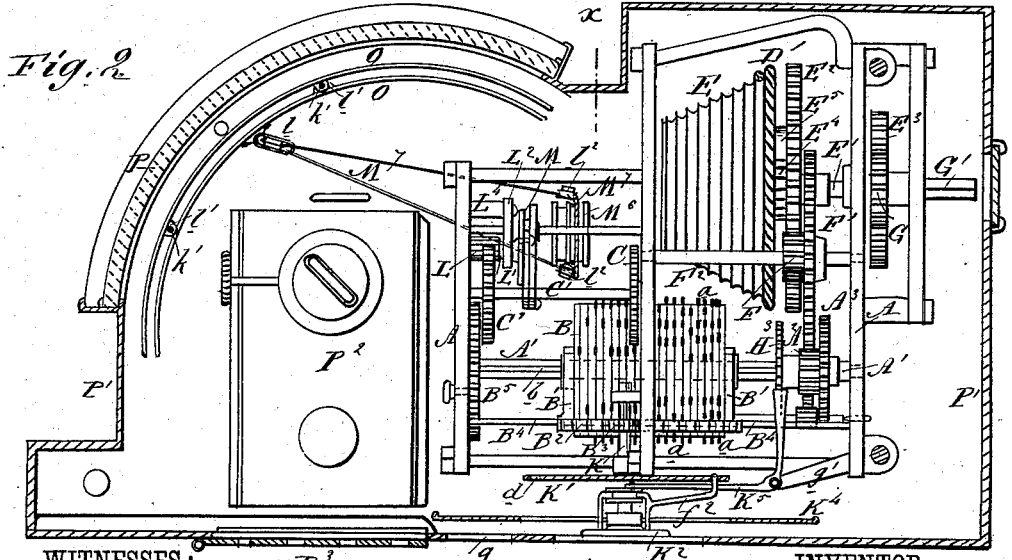

In the accompanying drawings, Figure 1 is an inboard or rear elevation of a flash-light apparatus or mechanism with parts removed and broken away to exhibit other parts. Fig. 2 is a plan of the same with cover and other parts removed. Fig. 3 is a sectional elevation of the same on line $x\ x$, Fig. 2, looking to the right. Fig. 4 is a sectional elevation of the same on line $x\ x$, Fig. 2, looking to the left. Fig. 5 is a front elevation of the lantern and mechanism for a fixed light. Fig. 6 is a transverse section on line $z\ z$, Fig. 5. Fig. 7 is a sectional elevation on line $y\ y$, Fig. 6. Fig. 8 is an elevation of the signal-cylinder and transmitting-wheel of the eclipsing-train. Fig. 9 is an enlarged plan of the governor or regulator. Fig. 10 is a front elevation of two signal-lanterns pivoted in a swinging frame. Fig. 11 is a side elevation of the same. Fig. 12 is a front elevation of a lantern designed to indicate the port side of a vessel. Fig. 13 is a rear elevation of the same. Fig. 14 is a reduced perspective view of a lantern for showing a fixed light.

Similar letters of reference indicate corresponding parts.

In the drawings, A represents the frame of the flash-light lantern, in which is supported a horizontal shaft, A', having fixed upon it the signal-cylinder B, upon whose circumference, in parallel circles, are as many sets of cogs or teeth $a$ as there are signals in the code, the number in this case being sixteen. These teeth $a$ are so arranged that every one required to form any one signal shall come into gear with the transmitting-wheel C during each revolution of the cylinder B, and said teeth $a$ are placed at such distances one from the other in each set that the required intervals between the alternate opening and closing of the screens O O may be obtained. The cylinder B is placed between the arms B' B', that are set on the shaft A' and have their upper ends connected by a rack, B², so that by means of a pinion, B³, meshing with the latter, said cylinder B may be made to move laterally upon a key, $b$, fixed in the shaft A', so that any set of teeth $a$ may be brought into gear with the train moving the screens O O. These arms B' B' are steadied or held in place by a horizontal rod, B⁴, whose ends are fixed in the frame A. The shaft A' also carries a loose wheel, B⁵, whose function will be hereinafter explained.

On a horizontal shaft, D, and within the drum D², is a coiled spring, D³, that gives motion to this mechanism. A cord or chain, D', connects the drum D² with a fusee, E, that is keyed on a shaft, E', and on this same shaft E' is secured a ratchet-wheel, E⁴, in which engages a dog, E⁵, held by spring E⁶, and a cog-wheel, E², which meshes in a pinion, F, that, together with a cog-wheel, F', is keyed on a shaft, F², that is journaled in the frame A. On the outer end of the shaft E' is keyed a cog-wheel, E³, that gears in a corresponding cog-wheel, G, that is fixed on the shaft G', to which the key is applied for winding up the aforesaid spring D³, and thereby setting the mechanism in motion. The cog-wheel F' meshes in a pinion, A², on the shaft A', to give motion to the latter, and a cog-wheel, A³, on the shaft A' gears with a pinion, H, on the shaft H', that carries a cog-wheel, H², gearing with a pinion, H⁴, on the shaft H⁵, which latter carries a worm-wheel, H⁶, which engages with the worm on the vertical governor-shaft I, whereby the speed of the shaft A' and signal-cylinder B is regulated. On the shaft A' is also fixed a ratchet-wheel, H³, whose functions will be hereinafter set forth.

Journaled in lugs c extending from the frame A is a transverse shaft, K, on which is keyed a pinion, B³, that engages in the rack B², so that by turning said shaft K to the right or left the signal-cylinder B is moved laterally.

Rigidly secured on the frame A is a disk, K', provided with holes d about its circumference, and moving on a spline, f, in the shaft K is a button, K², that is connected by arms f' with a grooved sliding collar, K³, on the same shaft, so that the said collar K³ shall be moved in and out by the movement of the button K², but so that the latter may be rotated without rotating the former. From one of these arms f' there projects an arm, f², whose free point is bent to enter the holes d in the disk K' to prevent the button K² from turning, or to hold it in the position in which it may be set; and on said shaft K is the indicator or registering-wheel K⁴, on the face of which, near its circumference, are formed or cut the numerals from 0 to 15, inclusive, as shown, said numerals corresponding to the number of signals in the code; and said wheel K⁴ is so set that when the cylinder B is set for forming any particular signal the number of such signal shall be exhibited inboard by or on the wheel K⁴ through an orifice, g, in the case of the lantern. The said wheel K⁴, rotating with the shaft K and pinion B³, thus registers the position of the cylinder B.

Secured to the inner face of the collar K³ is one end of a dog, K⁵, that is pivoted on a lug, g', extending from the frame A, and the other end of said dog K⁵ is in close juxtaposition to the ratchet-wheel H³, so that when the button K² is pushed inward to engage the arm f² in a hole, d, of the disk K' the dog K⁵ is released from the ratchet-wheel H³, and the cylinder B thereby permitted to revolve; and when the button K² is pulled outward to withdraw the arm f² and permit the setting of the cylinder B and indicator-wheel K⁴ the free end of the dog is thereby engaged in the ratchet H³ and prevents the revolution of said cylinder B. This lateral movement of the cylinder B is only made when the blank space on it (shown at h, Fig. 3) is opposed to the transmitting-wheel C.

The eclipsing-train is distinguished from the clock-train hereinbefore described, and is placed so that it may gear with the cogs a on the cylinder B, and is so arranged that a pulley at its extremity shall revolve at such a speed that a point upon any part of its circumference shall pass through a space equal to that passed through by a screen during the time the latter occupies to open or close. This may be effected by any ordinary reversing motion, but preferably by the device hereinafter shown and described—i. e., the shaft C', that carries the transmitting-wheel C of the eclipsing-train, is parallel with the shaft A', and has secured on its other end a cog-wheel, C², that gears with a pinion, L, on a spindle, L', that has one end journaled in the frame A and the other end supported by a curved arm, L², which extends from a stud, L⁴, to a stud, L⁵, which latter are projected from the frame A. On the outer end of this spindle L' is a face-plate, M, that is connected by a link, M', to a crank, M², resembling a bell-crank, that is fixed on a shaft, M³. The lower edge of the quadrant of the crank M² is cogged, as shown at k, and gears in a pinion, M⁴, on the shaft M⁵, on which shaft M⁵ is the pulley M⁶. This arrangement is such that each semi-revolution of the face-plate M gives a rocking motion to the crank M², which in turn communicates its motion to the pulley M⁶, about which is the cord or chain M⁷, that moves the screens O O. The signal-shaft A' gives motion to this train as follows: The wheel C is upon the same shaft, C', as the wheel C², that gears with the pinion L. The wheel C gears with the cylinder B, and by the motion thus given to it gives an equal motion to the wheel C², and from thence the motion is transmitted to the pinion L. This wheel C is of such a pitch (diameter) that a cog, a, upon the cylinder B will carry it round through the space of as many teeth as the pinion L requires to move in order to cause one complete movement of the screens O O, and the space upon the circumference of the wheel C equal to this required number of teeth is cut into a concave segment, as shown at a', whose radius is slightly in excess of that of the blank part h of the cylinder B. Therefore the pitch (diameter) of this wheel C must be so arranged that the number of teeth its circumference would bear must be a multiple of the number of teeth required to make one movement of the screens. For instance, if this latter movement is effected by three teeth of C² and the cylinder B has a pitch (diameter) which would give forty-five teeth, then the wheel C could be of the size to carry thirty teeth, and it would therefore have ten concave segments, a', separated by an equal number of spaces, into which the cogs a of the cylinder B would gear. The effect of this arrangement would be that a cog, $a$, of the cylinder B, gearing with the wheel C, would move the shaft C' through such an angle before the cog $a$ cleared itself as would make the wheel $C^2$ transmit the exact amount of motion required to effect either an opening or a closing of the screens O O, and the wheel C would then present a space in position for the following cog $a$ on the cylinder B to gear with; but if a blank on the cylinder B intervened, then a concave part of wheel C would ride so closely to this blank as to prevent motion of wheel C until the next cog $a$ presented itself, thus making sure that the cog $a$ would come truly into gear with wheel C. The screens O O are each of the width of one-half the depth necessary for shutting off the light from the lens P, and are designed to travel on upright guide-rods $k'$. When the apparatus is designed to be moved from one lens to another the guide-rods would be in a frame supported by brackets attached to the apparatus.

A double sheave or pulley, $l$, is fixed to both the upper and lower parts of the frame A centrally above and below the screens O O, and the said screens O O are provided with screw-eyes, lugs, or rollers $l'$ to travel on the guide-rods $k'$, and be thus retained in place. The cord or chain $M^7$ is now turned once or twice about the pulley $M^6$ at the extremity of the eclipsing-train, and both its ends are passed through leading-blocks $l^2$, that are placed directly below the pulley $M^6$, and then through the lower sheave $l$. One end of said cord $M^7$ is now made fast to the lower edge of the lower screen O, while the other end is carried up and attached to the top of the upper screen O, and is then passed over the upper sheave $l$ and brought down and made fast to the upper edge of the lower screen, O, as shown in Fig. 4. Other ways of arranging the cord $M^7$ may be adopted without departing from my invention. The screens O O are thereby so connected with each other and with the pulley $M^6$ that a revolution of the latter will cause the said screens O O to open apart one from the other, while the contrary motion of said pulley $M^6$ which follows, as hereinbefore set forth, will cause said screens O O to close upon one another, this latter movement making the necessary eclipse which breaks the light into the required flashes, whose length is regulated by the distance between the cogs $a$ of the cylinder B.

The regulating gear or train is a train of wheels, hereinbefore described, that gear with the cog-wheel $A^3$ on the signal-shaft $A'$. The last wheel, $H^6$, of this train gears with the worm-shaft I of the regulator or governor.

Fixed on the shaft I is a cross-head, I', through each end of which is passed loosely an angle-pin, $m$. That part of each pin $m$ beneath the cross-head I' is screw-threaded, and upon it works a small nut, $m'$, while the upper part of the pin $m$ carries a fan, $m^2$. A light spring, $m^3$, has one end attached to nut $m'$ and the other end to a pin, $m^4$, that projects downward from the cross-head I'. The fans $m^2$ are of such a size that when placed nearly in a line with the cross-head I' they will keep the machine at the desired speed when the cylinder B is out of gear with the eclipsing-train.

The action of the regulator or governor will be that when the machine is in regular motion the springs $m^3$ will turn the pins $m$ so that the fans $m^2$ will not present their full areas to the direction of the governor's revolution, but rather at such an angle as will keep the machine while in full work at the desired speed. When, however, in consequence of the blanks upon the cylinder B, the eclipsing-train is not in gear, the speed of the machine will be increased, and the springs $m^3$, having more to resist, will thus be more or less overpowered, and the fans $m^2$ will become proportionately more in line with the cross-head I', and the governor's area of resistance will be thus increased and the speed of the machine reduced. If, on the contrary, through the rolling of the ship or from other causes, a strain is put upon the moving parts of the machine, then its speed is lowered, and the springs $m^3$ in consequence bring the fans $m^2$ nearer a right angle to the cross-head I', and the resistance being thus decreased, the speed will be augmented until an equilibrium is again restored. This regulator or governor is set as follows: Place the loose wheel $B^5$ on the signal-shaft $A'$ in gear with the cog-wheel $C^2$. If the machine is found to go too fast, turn the nut $m'$ toward the upright part of the pins $m$. This will reduce the leverage of the springs $m^3$ and allow the fans $m^2$ to present a greater area of resistance. On the contrary, if the machine goes too slow, the nuts $m'$ must be turned in the opposite direction, which will increase the tension of the springs $m^3$, and the fans $m^2$ will then be turned so as to offer a less area of resistance, and the speed of the machine will be increased. Excepting when the speed of the machine is to be thus regulated, the wheel $B^5$ remains ungeared.

The outer casing of this device is represented at P' and the lamp to give the light at $P^2$, a ventilated door, $P^3$, giving access to said lamp $P^2$ and admitting air to support combustion.

In Figs. 5, 6, 7 is shown a fixed light, the frame Q of which, that carries the panels Q', containing the red and green glasses or lenses $Q^2$ $Q^3$, respectively, supports a perpendicular rod, R, bearing on a pivot, $n^4$, a disk, R', in an opening in one side of the center of which is a red glass, $n$, while in the other side is a green glass, $n'$. One panel Q' has a rod, $n^2$, extending from it, carrying a vertical post, $n^3$, so placed that the edge of the disk R' shall rub against it as said panel is moved up or down, and be thereby rotated.

The diameter of the disk R' and the length of the post $n^3$ are so regulated that as the said post $n^3$ is moved up and down it shall by friction give the said disk R' the amount of rotary motion required to show the proper colored light inboard for the information of the officer of the watch through the opening o in the back of lantern-case S'. The color shown at this aperture or opening o will be the same as that carried by the panel Q', which may be in position before the colorless lens S, that is fixed in the case S'. The panels Q' are held on vertical guide-rods p by eyes or lugs p', and outside of them is a panel, Q⁴, of metal or other opaque substance, to shut off the light of said lantern when required. The panels Q' are connected at their tops by a cord, p², so that when one is raised the other is thereby lowered, said cord p² passing over a sheave, p³, fixed on the top of the frame Q. All the panels Q' Q⁴ are raised or lowered by means of handles p⁴, and can, one or all, be held up by means of a button, p⁵, fixed on the top of the frame Q. The red lens Q² or the green lens Q³ may be elevated opposite the colorless lens S, through which the colored light is designed to be displayed; or the colorless lens S may be dispensed with and only the colored lenses used. In either of the above cases provision is made for shutting off the fixed light altogether by raising the opaque panel Q⁴, or by external or internal shutters of some kind, and, if desired, an arm may be made to project from the dark or opaque panel or screen Q⁴ to shut off the light from the aperture o when the screen itself is shutting off the light from the lenses. Q⁵ represents the lamp.

The flash and fixed lights may be shown from two distinct lanterns working in conjunction, or both from one lantern, as may be desired. When shown in two distinct lanterns in conjunction one lantern will be arranged to show the fixed light, while the other will be arranged to show the flash light, and, as shown in Figs. 10, 11, each lantern will be pivoted between the opposite arms q of a frame, T, which itself is centrally pivoted on a shaft, T', that may be projected from a davit or stanchion, T², so that when said frame T is revolved the said lanterns in swinging shall always retain their normal upright positions. The positions of the lanterns may be reversed when desired, showing the fixed above the flash light, or vice versa, and the frame T may be secured in any desired position. If displayed from one lantern, as shown in Figs. 12, 13, and 14, the front of the lantern will have two apertures, as shown at r r', one under the other, each fitted with a fixed colorless lens. The frame containing the colored glasses or fixed light and the box or frame containing the apparatus for exhibiting the flash light will be connected with one another. If the flash is in white light, the two frames will be connected by bands passing over suitable pulleys, so that said frames may travel in opposite directions up and down guide-rods provided for that purpose, and the bands will be of such a length that when the colored lens in a frame is opposite a colorless lens at r or r' the shutters or screens of the eclipsing-gear shall be in a proper position to shut off the light from the other lens r or r'. The said frames may be moved up and down by means of a crank, s, or other convenient device, and the handles p⁴ of the panels Q' Q⁴ may be manipulated through an opening, s'; and in the back of the lantern are also the apertures o and g, through the first of which the disk R' may be observed, while through the latter the number of the signal on the wheel K⁴ may be seen.

The lantern designed for the port side of a vessel is distinguished from that intended for the starboard side by a strip, u, of colorless glass inserted on each side of the lens S, or that on the starboard side may be so distinguished from that on the port side.

I do not confine myself in all particulars to the arrangement of parts as herein shown and described, as it is manifest that they may be modified without departing from my invention—as, for instance, one eclipsing-screen may be used instead of two and suitable mechanism be arranged to operate it. The colored lenses may run in a frame having suitable grooves, instead of moving on guide-rods. The flash light may be stationary and a lens be placed above and below it, from which to show the colored light, and when the colored light is shown from one of these lenses the other will be screened; and other changes may be made still within the spirit of the invention.

This apparatus is especially applicable for use as a side light for vessels or mast-head light for steamers. It can also be used with great advantage for light-houses, and in the following code I have endeavored to clearly set forth the application of the device to sailing-vessels, steamers, and light-houses, though of course the order and meanings of the several signals are open to revision and change, because it lies entirely within the province of government to regulate such signals.

The following is the code intended for the use of vessels and light-houses at night or during fog or snow-storms, so that by its means a communication may be established with those who are within sight or hearing.

The code can be divided into three sections, part 1 providing, first, signals which shall give the course to the nearest point that the vessel using it may be steering; second, the fact of her being hove to, close-hauled, or in stays; third, what she intends doing to avoid collision; fourth, whether she is showing her port or starboard side to the observer. Part 2 gives a number of signals, which can be applied to a vocabulary of such sentences as may be considered best adapted for use under such circumstances. Part 3 gives signals for the use of light-houses.

When the code is translated through the medium of light it shall be effected, first, by the use of a red or green light in conjunction with a white light, either of which may be made to assume a fixed or constant character or else be broken up into flashes; second, by a flash light shown without any accompanying light; third, by a fixed white light shown in conjunction with a white flash light. When sound is used the red, green, and white lights shall each be typified by blasts of a separate and distinctive length, while the flashes shall be rendered by blasts of a proportionate length to the flashes represented. The flashes are formed by the gradual opening and closing of the screens before the light, as explained in the description of the instrument by which it is effected, and the difference between the intervals of full light shown will mark the distinction between the long and short flashes— that is, supposing the short flash is made by an immediate return movement of the screens after they have attained their greatest opening, then a long flash may be shown by an interval—say of three seconds—of bright light occurring between these two movements of the screens.

Let the light which can be broken up into flashes be called the flash light, then the following variations in the order in which the light can be made to fall will give sixteen different combinations, as under. The eight different sequences into which a long and a short flash can be made to fall when taken in groups of three:

One short flash.
One long flash.
Short flashes.
Long flashes.
Short flashes alternating with eclipses.
Long flashes alternating with eclipses.
} Each of these signals will repeat itself continuously during the period of the signal, with the provision that a sufficient interval is left to allow for the operation of changing signals.

A short and a long flash, divided by an eclipse.
A long and a short flash, divided by an eclipse.

In all signals a period of repetition will be fixed upon, and the interval between the end of one signal and its recommencement may be expended either in an eclipse of light or as an interval of fixed light. This interval is also necessary to afford the opportunity during which any desired change of signal may be effected.

For convenience of reference, let these signals be arranged in any order that may be considered advisable, and then numbered consecutively from 0 to 15, both inclusive.

Part 1, for use in signaling courses, points of sailing, &c.: The flashes will be given in white light. Let the first ten of the above signals be assigned to represent the ten numerals from 0 to 9, both inclusive, and let the first nine of these numerals be taken to express angles from the meridian measured in points. (The signal for 9 as a numeral is of use in parts 2 and 3.) The red and the green lights shall be taken one to represent north and the other south—that is to say, that if red be taken as a characteristic of north, then the green shall be the characteristic of south, or vice versa; further, that when a colored light is displayed above or below a white light it shall be taken to express the one an easterly and the other a westerly course—that is, that if when a colored light is shown above a white light it is taken to represent an easterly course, then when the colored light is seen below a white light it shall represent a westerly course, or vice versa. Assuming, then, in all the following illustrations that a red light is characteristic of north and a colored light above a white light indicates an easterly course, let it be supposed that the bright light is flashing the combination corresponding to the numeral 2. Then, if the red light be seen above it, the course signaled will be two points east of north, or N. N. E., while if the red light is seen below the flash the course will be N. N.W. If, instead of a red light, a green one is used in the above two positions, then the courses will be respectively S. S. E. and S. S.W. The other numerals being used in like manner would thus give a signal for each of the thirty-two points of the compass. Suppose No. 9 be the signal to show that a vessel is hove to, then the color and position of the accompanying light may be made to express the quarter of the compass in which the middle course lies. Thus, if a red light is shown above the flash, it will signify, as above, that this middle course lies in the northeast quarter. If No. 10 be appropriated to show that a vessel is close-hauled, then, again, this signal, taken in conjunction with the color and position of the accompanying light, will at once indicate the quarter of the compass in which the vessel is sailing close-hauled. Thus, if a red light is shown above this signal, it signifies that the vessel is sailing close-hauled upon a north-easterly course, and this fact, taken in connection with the known direction of the wind, will at once give whether she is upon the port or starboard tack. Signal No. 11 may be selected to show that the vessel is in stays, and as the accompanying light will indicate what tack she was last upon, (as defined in the explanation of the preceding signal,) it will at once be seen to what tack she is now in the act of changing. The remaining signals may or may not be shown with an accompanying colored light; but for the purposes of this section of the code it is thought better in other respects to let the white light be seen above, and thus Nos. 12, 13, 14, and 15—that is, all signals not used as courses or points of sailing—can have meanings assigned them indicative of the means the vessel intends to adopt to avoid collision, or any other significations such as may be considered desirable by the maritime authorities. A strip or strips of white light shown from the same lantern at the side of or immediately above or below any colored light will be the mark of distinction between the signals, as shown from the different sides of the vessel—that is, if a colored light having these adjacent band or bands of white light be taken as a signal shown from the port side of a vessel, then a colored light without these bands will denote a signal shown from the starboard side, or vice versa.

Part 2 is intended to give a more extended vocabulary, and this is effected by the following means: first, by all the signals not used in part 1 which can be formed by a continuous colored light being displayed above or below each one of the sixteen signals made by the flash light, which latter will then show a white light; second, by any one of the sixteen flash signals not used in this manner in part 1 being shown alone, the signal being given in white light; third, by all the signals which can be formed from the red, green, and white lights when the flash is given by a colored instead of a white light, and a fixed light is shown by the white light in a position either above or below the flash light; fourth, by a red or green flash light being displayed by itself; fifth, with the numeral signals as established in part 1 numbers may be formed by showing these signals in succession in any desired order, and to each of the numbers thus made a meaning can be assigned.

Part 3 is intended for light-house nomenclature. Let each light-house be assigned a number. This number can then be given by the flash light, as explained in the fifth article of part 2, care being taken to provide an interval of darkness between following numbers of the same signal. In addition to this flash, a continuous light may be shown either above or below the flash. The number can have a different signification, according as the fixed light is above or below the flash. The fixed light may also be taken as a distinctive mark between the numeral signals as shown from a light-house and those as shown from a vessel.

*Table of flash signals.*—The following is the order in which it is suggested that the signals given by the flash light should fall, and in this table a long and a short flash are denoted respectively by the letters L and S and an eclipse of three seconds by Ecl. The time occupied by the opening or closing of the screens is taken as three seconds, and the period of repetition once every forty-five seconds.

Number of signal.
0—S.
1—S S S.
2—S S L.
3—S L S.
4—S L L.
5—L L L.
6—L L S.
7—L S L.
8—L S S.
9—L.
10—Continuous fixed light for 30 S.
11—S S S S S S.
12—S Ecl. S Ecl. S Ecl. S.
13—L Ecl. L Ecl. L.
14—S Ecl. L.
15—L Ecl. S.

Part 1.

| No. of signal. | Red above flash. | Red below flash. |
|---|---|---|
| 0 | North. | North. |
| 1 | N. by E. | N. by W. |
| 2 | N. N. E. | N. N. W. |
| 3 | N. E. by N. | N. W. by N. |
| 4 | N. E. | N. W. |
| 5 | N. E. by E. | N. W. by W. |
| 6 | E. N. E. | W. N. W. |
| 7 | E. by N. | W. by N. |
| 8 | East. | West. |
| 9 | Hove to. } In N. E. quarter. | Hove to. } In N. W. quarter. |
| 10 | Close-hauled. | Close-hauled. |
| 11 | In stays from close-hauled. | In stays from close-hauled. |

| No. of signal. | Green above flash. | Green below flash. |
|---|---|---|
| 0 | South. | South. |
| 1 | S. by E. | S. by W. |
| 2 | S. S. E. | S. S. W. |
| 3 | S. E. by S. | S. W. by S. |
| 4 | S. E. | S. W. |
| 5 | S. E. by E. | S. W. by W. |
| 6 | E. S. E. | W. S. W. |
| 7 | E. by S. | W. by S. |
| 8 | East. | West. |
| 9 | Hove to. } In S. E. quarter. | Hove to. } In S. W. quarter. |
| 10 | Close-hauled. | Close-hauled. |
| 11 | In stays from close-hauled. | In stays from close-hauled. |

*Flash light shown alone.*

9. Heave to.
10. I intend to stand on.
11. I intend to go astern, or heave all back.
12. I intend to port my helm.
13. I intend to starboard my helm.
14. Port your helm.
15. Starboard your helm.

*Part 2—Flash light shown alone.*

0. Fire or leak—want immediate assistance.
1. Aground—want immediate assistance.
2. Mutiny—want immediate assistance.
3. In want of provisions—starving.
4. I want a surgeon.
5. I want a pilot.
6. I want a tug.
7. I am unmanageable.
8. Tack instantly.

*Flash and colored light.*

$\dfrac{R}{12}$ I must abandon the vessel.

$\dfrac{12}{R}$ I will assist you.

$\dfrac{G}{12}$ No assistance can be rendered.

$\dfrac{12}{G}$ I am sinking.

$\frac{}{13}$ Stand by me until morning.

$\frac{13}{R}$ Keep a light burning.

$\frac{G}{13}$ I am in difficulties. Direct me how to steer.

$\frac{13}{G}$ Steer after me. (Any other direction may be given by a course-signal.)

$\frac{R}{14}$ You are running into danger.

$\frac{14}{R}$ I want to communicate. I will board you.

$\frac{G}{14}$ I want to communicate. Will you board me?

$\frac{14}{G}$ Cannot send a boat.

$\frac{R}{15}$ Repeat your signal.

$\frac{15}{-}$ Yes—assent.

$\frac{G}{15}$ No—negative.

$\frac{15}{S}$ Annul last signal. I have made a mistake.

Having thus fully described my invention, I claim as new and desire to secure by Letters Patent—

1. In a signaling apparatus, the combination, with the transmitting-wheel C, the cogged signal-cylinder B, and the driving mechanism, of the eclipsing-train, consisting of the cog-wheel $C^2$, the pinion L, the face-plate M, link $M'$, cogged crank $M^2$, and pinion $M^4$, substantially as and for the purpose set forth.

2. In a signaling apparatus, the combination, with the driving mechanism and the governor-shaft I, of the signal-cylinder B, the cog-wheels $A^3$ $H^2$, pinions H $H^4$, and worm-wheel $H^6$, substantially as and for the purpose set forth.

3. In a signaling apparatus, the combination, with the guide-rods $k'$, the pulleys $l$ $l^2$, the drive-pulley $M^6$, and the cord $M^7$, of the screens O, provided with eyes or lugs $l'$, substantially as and for the purpose set forth.

4. In a signaling apparatus, the combination, with the signal-shaft $A'$, provided with the cog-wheel $A^3$, the eclipsing-train, and the regulating-gear, of the wheel $B^5$, loosely mounted upon the said signal-shaft, substantially as and for the purpose set forth.

5. In a flash-light signaling apparatus, the combination, with the transmitting wheel and shaft C $C'$ and cog-wheel $C^2$, of the pinion L, face-plate M, link and cogged crank $M'$ $M^2$, pinion $M^4$, and pulley $M^6$, substantially as herein shown and described, whereby intermittent motion is transmitted through suitable cords or chains to the eclipsing-screens, as set forth.

6. In a flash-light signaling apparatus, the combination, with the signal shaft and cylinder $A'$ B, of the arms $B'$ $B'$, rack $B^2$, pinion $B^3$, and shaft K, substantially as herein shown and described, whereby said signal-cylinder may be moved laterally, as set forth.

7. In a signaling apparatus, the combination, with the shaft K, provided with spline $f$, of the perforated disk $K'$, button $K^2$, arms $f'$, grooved sliding collar $K^3$, arm $f^2$, and regulating-wheel $K^4$, substantially as and for the purpose described.

8. The combination, with the shaft K, arms $f^2$ $f'$, disk $K'$, button $K^2$, and sliding collar $K^3$, of the pivoted dog $K^5$, substantially as and for the purpose described.

9. In a signaling apparatus, the combination, with the lantern provided with two colored lights and an eclipsing-screen, of the revolving disk $R'$, provided with glass of two colors, and fixed at the rear of the lantern so as to be rotated synchronously with the operation of eclipsing-screen, substantially as herein shown and described, whereby the color displayed by the lantern is indicated inboard, as set forth.

The above specification of my improved signaling apparatus signed by me this 15th day of July, 1881.

WILLIAM C. SEATON.

Witnesses:
   I. I. STORER,
   C. SEDGWICK.